(12) United States Patent
Obuchi

(10) Patent No.: US 11,364,771 B2
(45) Date of Patent: Jun. 21, 2022

(54) CONTROL APPARATUS FOR HYBRID VEHICLE

(71) Applicant: TOYOTA JIDOSHA KABUSHIKI KAISHA, Toyota (JP)

(72) Inventor: Tsuyoshi Obuchi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 755 days.

(21) Appl. No.: 16/367,754

(22) Filed: Mar. 28, 2019

(65) Prior Publication Data
US 2019/0308490 A1  Oct. 10, 2019

(30) Foreign Application Priority Data
Apr. 4, 2018 (JP) .............................. JP2018-072645

(51) Int. Cl.
| | | |
|---|---|---|
| B60H 1/03 | (2006.01) | |
| B60L 1/02 | (2006.01) | |
| F02N 19/10 | (2010.01) | |
| B60W 30/192 | (2012.01) | |
| B60W 10/30 | (2006.01) | |
| B60W 10/06 | (2006.01) | |
| B60K 6/22 | (2007.10) | |
| B60L 58/13 | (2019.01) | |

(52) U.S. Cl.
CPC .............. *B60H 1/034* (2013.01); *B60K 6/22* (2013.01); *B60L 58/13* (2019.02); *B60W 10/06* (2013.01); *B60W 10/30* (2013.01); *B60L 2240/36* (2013.01)

(58) Field of Classification Search
CPC ..... B60H 1/034; B60L 58/13; B60L 2240/36; B60K 6/22; B60W 10/06; B60W 10/30
See application file for complete search history.

(56) References Cited

U.S. PATENT DOCUMENTS

| | | | | |
|---|---|---|---|---|
| 5,291,960 A | * | 3/1994 | Brandenburg | ........ B60W 10/26 123/41.14 |
| 6,810,977 B2 | * | 11/2004 | Suzuki | .................. B60W 20/00 123/41.14 |
| 2003/0172643 A1 | | 9/2003 | Suzuki | |

FOREIGN PATENT DOCUMENTS

| | | | |
|---|---|---|---|
| JP | 2003-269208 A | 9/2003 | |
| JP | 2011-157035 A | 8/2011 | |
| JP | 2013163495 A | * 8/2013 | ............ B60W 10/06 |

* cited by examiner

*Primary Examiner* — Tisha D Lewis
(74) *Attorney, Agent, or Firm* — Oliff PLC

(57) ABSTRACT

The control apparatus includes a heater configured to generate heat to heat the internal combustion engine, a controller configured to control a heat exchange system in such a way as to transfer EV exhaust heat to the internal combustion engine, and an controller configured to let electrical power be supplied from a battery to the heater before the internal combustion engine is started if it is predicted that a specific warmed-up condition of the internal combustion engine will not be established before the start of the internal combustion engine and not to let electrical power be supplied from a battery to the heating if it is predicted that a specific warmed-up condition of the internal combustion engine will be established before the start of the internal combustion engine.

5 Claims, 12 Drawing Sheets

CONTROL APPARATUS FOR HYBRID VEHICLE

CROSS REFERENCE TO RELATED APPLICATION

This application claims the benefit of Japanese Patent Application No. 2018-072645, filed on Apr. 4, 2018, which is hereby incorporated by reference herein in its entirety.

BACKGROUND

Technical Field

The present disclosure relates to a control apparatus for a hybrid vehicle.

Description of the Related Art

It is known in the art relating to hybrid vehicles provided with an internal combustion engine and a motor to pre-heat the internal combustion engine by heating means when the remaining capacity of the battery that supplies electrical power to the motor reaches or exceeds a predetermined amount greater than a specific lower limit of the battery capacity at which the battery is charged using the driving force of the internal combustion engine while the vehicle is running by the driving force of the motor (i.e. running in EV mode) (see, for example, Patent Literature 1 in the citation list below).

Patent Literature 2 teaches to cause cooling water of the internal combustion engine to flow to a cooling circuit for the motor when the internal combustion engine of a hybrid vehicle is warming up. Thus, the heat of the motor is transferred to the cooling water of the internal combustion engine to facilitate early heating of the internal combustion engine.

CITATION LIST

Patent Literature

Patent Literature 1: Japanese Patent Application Laid-Open No. 2003-269208
Patent Literature 2: Japanese Patent Application Laid-Open No. 2011-157035

SUMMARY

Technical Problem

Facilitating early heating of an internal combustion engine during its warming-up according to prior art (e.g. Patent Literature 2) enables a reduction in the amount of harmful substances discharged from the internal combustion engine in the period from its start to the completion of warming-up. Nevertheless, harmful substances are still discharged from the internal combustion engine during the warming-up operation until the completion of the warming-up.

The amount of harmful substances discharged from an internal combustion engine during its startup can be reduced by electrically heating the internal combustion engine in advance before the internal combustion engine is started. However, the electrical energy needed to electrically heating the internal combustion engine is somewhat large, and it has been desired to reduce the energy consumption in electrically heating the internal combustion engine in advance before it is started.

The present disclosure has been made to solve the above problems, and an object of the present disclosure is to enable a control apparatus for a hybrid vehicle capable of electrically heating its internal combustion engine to achieve both a reduction of emissions of harmful substances from the vehicle during the startup of the internal combustion engine and a reduction of electrical energy needed to electrically heat the internal combustion engine.

Solution

To solve the above problems, according to the present disclosure, there is provided a control apparatus for a hybrid vehicle provided with an internal combustion engine and an electric motor and capable of running in EV mode in which the hybrid vehicle runs by driving force generated by the electric motor with the internal combustion engine turned off, comprising: a heat exchange system configured to be capable of recovering EV exhaust heat, which is defined as heat generated in a specific drive apparatus including the electric motor while the hybrid vehicle is running in the EV mode, by a coolant and transferring the EV exhaust heat to the internal combustion engine by means of the coolant; a heater configured to generate heat when electrical power is supplied to it, to heat the internal combustion engine; a battery that supplies electrical power to the heater; and a controller configured to: determine whether or not a specific condition that the internal combustion engine is in a specific warmed-up state is met when the hybrid vehicle is running in the EV mode; perform a heat exchange control to control the heat exchange system in such a way that the EV exhaust heat is transferred to the internal combustion engine while the hybrid vehicle is running in the EV mode, if it is determined by the controller that the specific condition is not met; predict whether not the specific condition will be met as a result of the heat exchange control performed by the controller before the internal combustion engine is started; and control supply of electrical power from the battery to the heater in such a way as to let electrical power be supplied from the battery to the heater before the internal combustion engine is started if it is predicted by the controller that the specific condition will not be met before the start of the internal combustion engine and not to let electrical power be supplied from the battery to the heater if it is predicted by the controller that the specific condition will be met before start of the internal combustion engine.

When the internal combustion engine is not in the specific warmed-up state, the above control apparatus for a hybrid vehicle can raise the temperature of the internal combustion engine by performing the heat exchange control by the controller. The specific warmed-up state refers to a state in which the internal combustion engine is warmed up to such an extent that the amount of harmful substances discharged from the internal combustion engine is made smaller than a certain amount. The controller determines whether or not the specific condition that the internal combustion engine is in the specific warmed-up state is met on the basis of a specific parameter indicating the warmed-up state of the internal combustion engine (e.g. the temperature of a specific portion of the internal combustion engine or the temperature of the cooling water of the internal combustion engine).

The above control apparatus for a hybrid vehicle can also raise the temperature of the internal combustion engine by electrically heating the internal combustion engine by the heater. The electric heating of the internal combustion engine by the heater is controlled by the controller that controls electrical power supply from the battery to the heater. As above, the control apparatus for a hybrid vehicle can raise the temperature of the internal combustion engine in a mode controlled by the controller and in a mode controlled by the controller.

The temperature of the internal combustion engine cannot be raised sufficiently only by the heat exchange control in some cases. Using only electric heating of the internal combustion engine by the heater encounters the problem of increased electrical energy consumption. To solve the problem, if the internal combustion engine is not in the specific warmed-up state, the control apparatus for a hybrid vehicle according to the present disclosure performs the heat exchange control while the hybrid vehicle is running in the EV mode and predicts whether or not the specific condition will be met as a result of execution of the heat exchange control before the internal combustion engine is started.

If it is predicted that the specific condition will not be met before the start of the internal combustion engine, the controller lets electrical power be supplied from the battery to the heater before the internal combustion engine is started. Thus, the internal combustion engine is electrically heated by the heater. In consequence, the temperature of the internal combustion engine rises higher than in the case where the internal combustion engine is not electrically heated by the heater. Hence, emissions of harmful substances from the vehicle during its startup can be reduced. Moreover, the heat exchange control is also performed in addition to the electric heating of the internal combustion engine by the heater. This can make the electrical energy consumption smaller than in the case where the temperature of the internal combustion engine is raised only by the electric heating of the internal combustion engine by the heater.

If it is predicted that the specific condition will be met before the start of the internal combustion engine, the controller does not let electrical power be supplied from the battery to the heater. This enables a reduction in the electrical energy needed to raise the temperature of the internal combustion engine.

As above, the control apparatus for a hybrid vehicle according to the present disclosure can achieve both a reduction of emissions of harmful substances from the vehicle during the startup of the internal combustion engine and a reduction of electrical energy needed to electrically heat the internal combustion engine.

The controller may be configured to predict whether or not the specific condition will be met before the internal combustion engine is started at a certain time while the heat exchange control is being performed by the controller. In the control apparatus for a hybrid vehicle according to the present disclosure, if it is predicted by the controller that the specific condition will not be met before the start of the internal combustion engine, the controller may let electrical power be supplied from the battery to the heater, and the controller may terminate the heat exchange control before the internal combustion engine is started. If it is predicted by the controller that the specific condition will be met before the start of the internal combustion engine, the controller may not let electrical power be supplied from the battery to the heater, and the controller may continue to perform the heat exchange control.

The control apparatus for a hybrid vehicle configured as above can prevent the heat generated by the heater from being carried away by the coolant. In the case where a portion of the internal combustion engine that is heated by the heater is near a portion through which the coolant that has recovered the EV exhaust heat flows, if the supply of electrical power to the heater and the heat exchange control are performed at the same time, there is possibility that the heat generated by the heater may be carried away by the coolant. Stopping the execution of the heat exchange control when the heater generates heat can prevent the heat generated by the heater from being carried away by the coolant.

The heater may be configured to be capable of heating a specific adhesion site relevant to adhesion of fuel injected through a fuel injection valve provided in the internal combustion engine. Then, even if fuel adheres to the adhesion site, evaporation of the fuel is facilitated, so that emissions of harmful substances from the internal combustion can be reduced.

The controller may be configured to obtain the temperature of the adhesion site. In this case, the controller may determine that the specific condition is met, if the temperature of the adhesion site obtained by the controller while the hybrid vehicle is running in the EV mode is equal to or higher than a first threshold temperature. The controller may predict that the specific condition will not be met before the internal combustion engine is started, if the temperature of the adhesion site obtained by the controller while the hybrid vehicle is running in the EV mode is lower than a second threshold temperature that is lower than the first threshold temperature. If it is predicted by the controller that the specific condition will not be met before the start of the internal combustion engine, the controller may control the electrical energy supplied from the battery to the heater on the basis of the temperature of the adhesion site obtained by the controller.

The first threshold temperature is defined as a temperature at which the adhesion of fuel to the adhesion site can be prevented. When the temperature of the adhesion site is equal to or higher than the first threshold temperature, the internal combustion engine is in the specific warmed-up state. The second threshold temperature is defined as such a temperature that if the temperature of the adhesion site is equal to or higher than the second threshold temperature (and lower than the first threshold temperature) at a specific time while the vehicle is running in the EV mode, the specific warmed-up state of the internal combustion engine can be established by the time the internal combustion engine is started by continuously performing the heat exchange control during the period from the aforementioned specific time to the start of the internal combustion engine. Therefore, if the temperature of the adhesion site is lower than the second threshold temperature at the aforementioned specific time, the specific warmed-up state of the internal combustion engine cannot be established even if the heat exchange control continues to be performed during the period from the aforementioned specific time to the start of the internal combustion engine. Then, the controller lets electrical power be supplied from the battery to the heater. Moreover, the controller controls the electrical energy supplied from the battery to the heater on the basis of the temperature of the adhesion site. Specifically, the controller makes the electrical energy to be supplied larger when the difference between the first threshold temperature and the temperature of the adhesion site is large than when the difference is small. If the temperature of the adhesion site is equal to or higher than the second threshold temperature at the aforementioned specific time, the controller does not let electrical power be supplied from the battery to the heater. The above control also enables both a reduction of emissions of harmful substances from the vehicle during the startup of the internal combustion engine and a reduction of electrical energy needed to electrically heat the internal combustion engine.

In the above-described control apparatus for a hybrid vehicle, the controller may predict a start time at which the internal combustion engine will be started next time when the hybrid vehicle is running in the EV mode, calculate a remaining time from the present to the start time, and predict whether or not the specific condition will be met before the internal combustion engine is started at the time when the remaining time becomes equal to a time required to bring the internal combustion engine into the specific warmed-up state only by electrically heating the internal combustion engine by the heater. Then, the specific warmed-up state of the internal combustion engine can be favorably established before the start of the internal combustion engine. Consequently, a reduction of emissions of harmful substances from the vehicle during the startup of the internal combustion engine and a reduction of electrical energy needed to electrically heat the internal combustion engine can both be achieved.

Advantageous Effects

The present disclosure enables a control apparatus for a hybrid vehicle capable of electrically heating its internal combustion engine to achieve both a reduction of emissions of harmful substances from the vehicle during the startup of the internal combustion engine and a reduction of electrical energy needed to electrically heat the internal combustion engine.

DESCRIPTION OF THE EMBODIMENTS

In the following, modes for carrying out the present disclosure will be described specifically with reference to the drawings for illustrated purpose. The dimensions, materials, shapes, relative arrangements, and other features of the components that will be described in connection with embodiments are not intended to limit the technical scope of the present disclosure only to them, unless otherwise stated.

First Embodiment

In the first embodiment, the present disclosure is applied to a hybrid vehicle provided with an internal combustion engine and a motor-generator.

<Configuration of Hybrid Vehicle>

Figure 1:
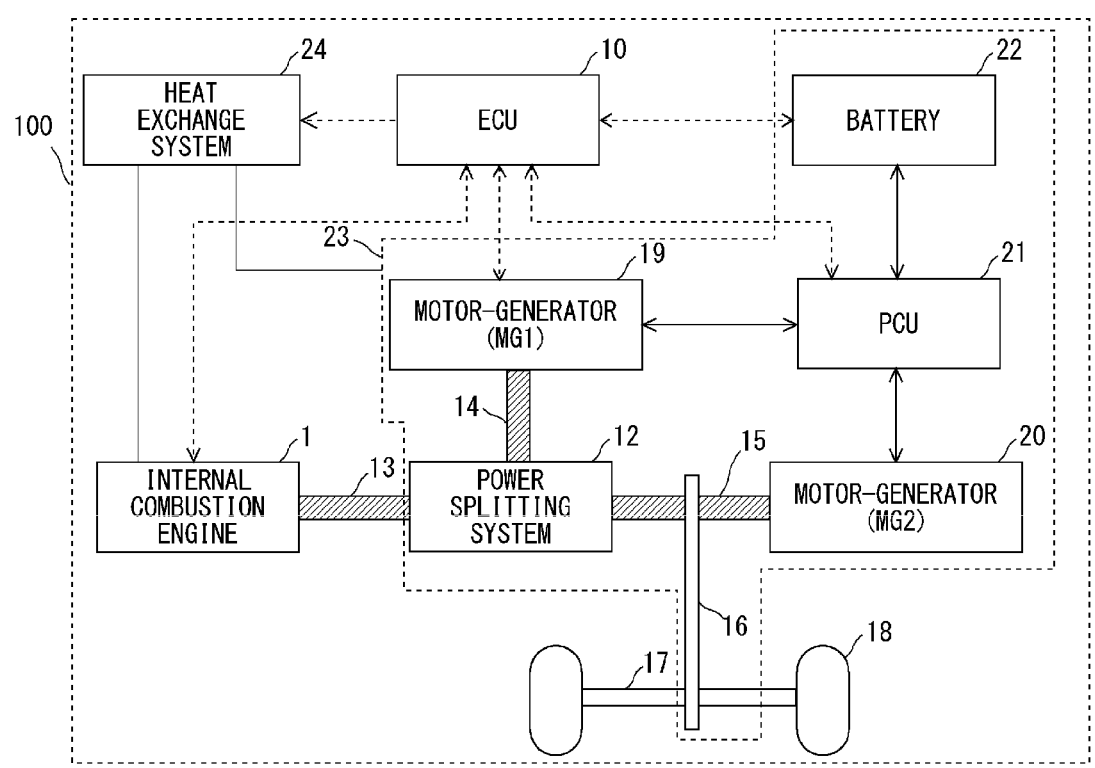
FIG. 1 is a diagram illustrating the general configuration of a vehicle according to an embodiment of the present disclosure.

FIG. 1 is a diagram illustrating the general configuration of a vehicle 100 according to the first embodiment. Vehicle 100 illustrated in FIG. 1 has an internal combustion engine 1, a first motor-generator 19, and a second motor-generator 20 as drive sources. The first motor-generator 19 and the second motor-generator 20 are known synchronous electric motors that function as both a generator and a motor.

The major components of the vehicle 100 include, besides the above, an electronic control unit (ECU) 10, a power splitting system 12, a reduction gear 16, a power control unit (PCU) 21, and a battery 22. As illustrated in FIG. 1, the crankshaft of the internal combustion engine 1 is connected to an output shaft 13, which in turn is connected to the power splitting system 12. The power splitting system 12 is connected with the first motor-generator 19 through a power transmission shaft 14 and with the second motor-generator 20 through a power transmission shaft 15. The power splitting system 12 employs a known planetary gear mechanism (not illustrated) to distribute and gather the mechanical powers of the internal combustion engine 1, the first motor-generator 19, and the second motor-generator 20 to transmit powers. The power transmission shaft 15 is connected with the reduction gear 16, and the power output of the driving source is transmitted to a drive shaft 17 through the reduction gear 16. Thus, the drive wheels 18 connected with the drive shaft 17 are driven to cause the vehicle 100 to run.

The PCU 21 is electrically connected with the first motor-generator 19, the second motor-generator 20, and the battery 22. The PCU 21 includes an inverter (not illustrated) and is configured to be capable of converting direct current power provided by the battery 22 into alternating current power and converting alternating current power generated by the first motor-generator 19 and the second motor-generator 20 into direct current power. The PCU 21 is capable of converting alternating current power generated by the first motor-generator 19 and the second motor-generator 20 into direct current power and supplying the direct current power to the battery 22. The PCU 21 is also capable of converting direct current power supplied from the battery 22 into alternating current power and supplying the alternating current power to the first motor-generator 19 and the second motor-generator 20.

When driven by the internal combustion engine 1 through the power splitting system 12, the first motor-generator 19 generates alternating current power. The first motor-generator 19 as such will be hereinafter referred to as "MG1". The second motor-generator 20 outputs shaft rotation to the power transmission shaft 15 to supply drive force to the vehicle 100. Moreover, the second motor-generator 20 generates alternating current power when it is driven by shaft rotation input to it from the power transmission shaft 15 during deceleration of the vehicle 100. The second motor-generator 20 as such will be hereinafter referred to as MG2.

The ECU 10 is an electronic control unit including a CPU, a ROM, a RAM, and a backup RAM. The ECU 10 is connected, by electric wiring, with various sensors (not illustrated) such as a vehicle speed sensor that acquires the vehicle speed and an SOC sensor that acquires the state of charge (SOC) of the battery 22, more specifically the amount of charge stored in the battery 22, which will also be referred to as the "SOC amount" hereinafter. The signals output from these sensors are input to the ECU 10.

The ECU 10 recognizes the operation states of the internal combustion engine 1, the MG1, the MG2, and the battery 22 on the basis of the output signals of these sensors and optimizes the running mode of the vehicle 100 on the basis of the operation states of these components. For example, when the required drive load of the vehicle 100 is relatively large, the ECU 10 causes the vehicle 100 to run in the mode in which the power output of the internal combustion engine 1 and the power output of the MG2 are used as the drive source. When, for example, the SOC amount of the battery 22 is relatively large and the required drive load of the vehicle 100 is relatively small, the ECU 10 causes the vehicle 100 to run in the mode in which only the power output of the MG2 is used as the drive source with the internal combustion engine 1 turned off (EV mode running). In such EV mode running, either only the power output of the MG2 or the power output of both the generator MG1 and the MG2 may be used as the drive source.

When the vehicle 100 is running in the EV mode, the PCU 21 converts direct current power supplied from the battery 22 into alternating current power and supplies it to the MG2 (and the MG1). The power output of the MG2 (and the MG1) is input to the power splitting system 12 through the power transmission shaft 15 (and the power transmission shaft 14), and its power output is transmitted to the drive shaft 17 through the reduction gear 16. Heat is generated in the above process from the supply of electrical power from the battery 22 to the transmission of drive force generated by the supplied electrical power to the drive shaft 17. This heat will be referred to as "EV exhaust heat", and the system including the MG1, the MG2, the power splitting system 12, the power transmission shafts 14, 15, the reduction gear 16, the PCU 21, and the battery 22 will be referred to as the "EV drive system 23". To put the above in this terminology, the EV drive system 23 generates EV exhaust heat while the vehicle 100 is running in the EV mode. In this embodiment, the EV drive system 23 corresponds to the specific drive apparatus according to the present disclosure.

The vehicle 100 has a heat exchange system 24, which is used to transfer the EV exhaust heat to the internal combustion engine 1. Details of the heat exchange system 24 will be described later.

<Configuration of Internal Combustion Engine>

Figure 2:
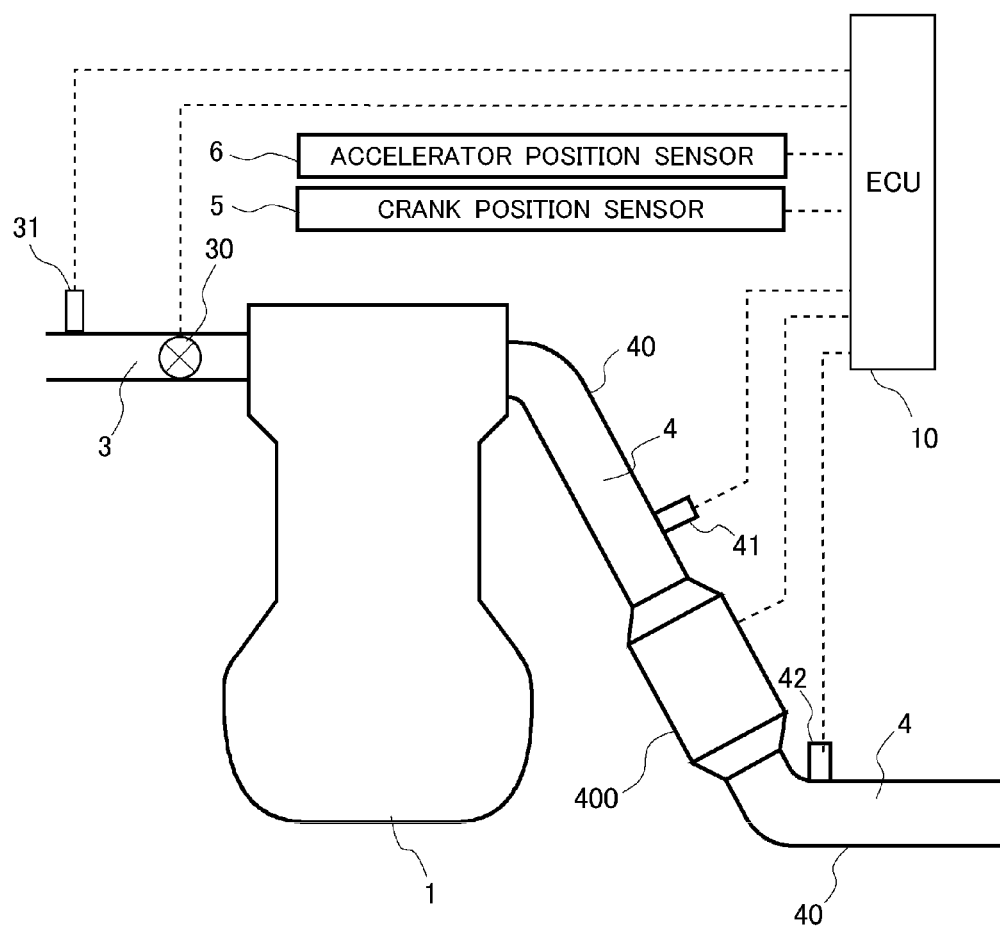
FIG. 2 is a diagram illustrating the general configuration of an internal combustion engine according to the embodiment of the present disclosure.
Figure 3:
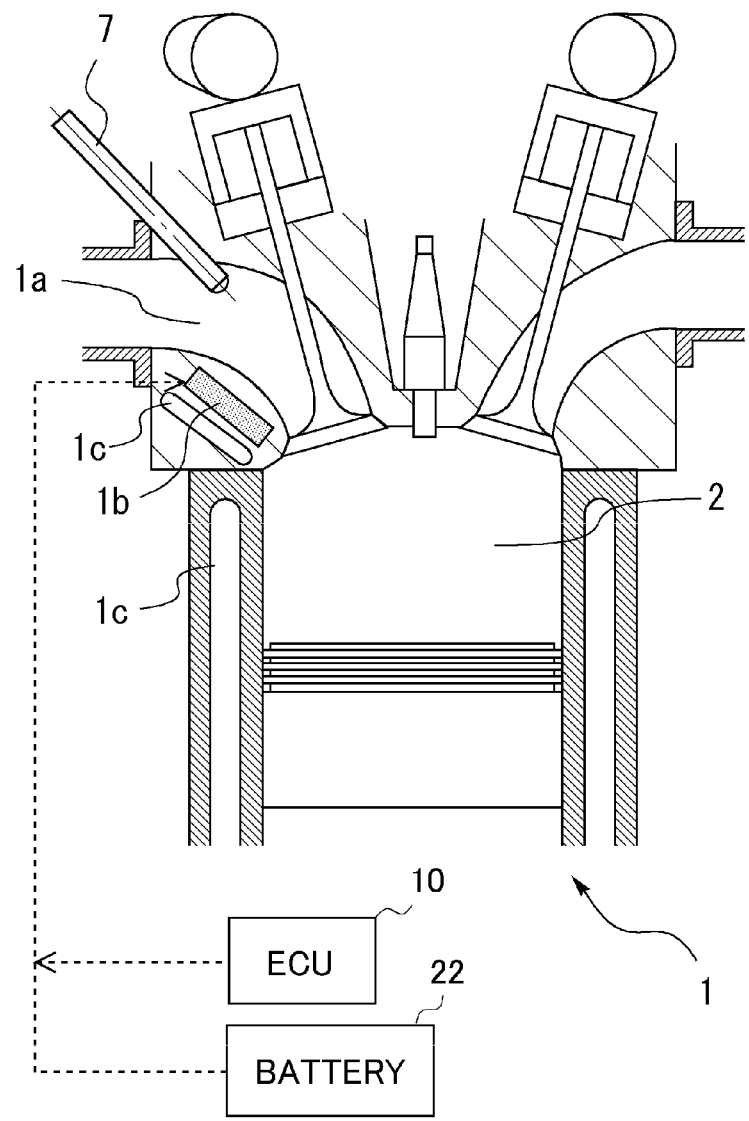
FIG. 3 is a first schematic cross sectional view of a cylinder of the internal combustion engine according to a first embodiment of the present disclosure.

FIG. 2 is a diagram illustrating the general configuration of the internal combustion engine 1. The internal combustion engine 1 illustrated in FIG. 2 is a spark-ignition internal combustion engine provided in the vehicle 100 that operates using gasoline as fuel. FIG. 3 is a schematic cross sectional view of a cylinder of the internal combustion engine 1. As illustrated in FIG. 3, the internal combustion engine 1 is provided with a fuel injection valve 7 that supplies fuel into the cylinder 2. The fuel injection valve 7 is adapted to inject fuel into an intake port 1a. A ceramic heater 1b for heating the intake port 1a is embedded in the wall of the intake port 1a opposed to the fuel injection valve 7. The ceramic heater 1b is a heating element that functions as an electrical resistance when electrical current is supplied thereto to generate heat. The effect of the ceramic heater 1b will be described later. The cylinder block and the cylinder head of the internal combustion engine 1 are provided with a water jacket 1c for cooling them.

The internal combustion engine 1 is connected with an intake passage 3, through which fresh air to be taken into the cylinder flows. The intake passage 3 is provided with a throttle valve 30 that is capable of varying the channel cross sectional area in the intake passage 3 to control the quantity of air taken into the internal combustion engine 1. The intake passage 3 upstream of the throttle valve 30 is provided with an air flow meter 31 that measures the quantity (mass) of the fresh air flowing in the intake passage 3.

The internal combustion engine 1 is connected with an exhaust passage 4, through which burned gas (exhaust gas) discharged from the cylinder flows. The exhaust passage 4 is constituted by an exhaust pipe 40, which is provided with a catalyst casing 400. The catalyst casing 400 includes a cylindrical casing that houses a catalyst carrier on which an exhaust gas purification catalyst is supported. In this embodiment, specifically, the exhaust gas purification catalyst supported on the catalyst carrier is a three-way catalyst. The exhaust passage 4 upstream of the catalyst casing 400 is provided with an air-fuel ratio sensor 41 that measures the air-fuel ratio of the gas flowing into the catalyst casing 400. The exhaust passage 4 downstream of the catalyst casing 400 is provided with an exhaust gas temperature sensor 42 that measures the temperature of the gas flowing out of the catalyst casing 400.

The ECU 10 is electrically connected with various sensors such as a crank position sensor 5, an accelerator position sensor 6 besides the air flow meter 31, the air-fuel ratio sensor 41, and the exhaust gas temperature sensor 42 mentioned above. The crank position sensor 5 outputs an electrical signal representing the rotational position of the output shaft (i.e. the crankshaft) of the internal combustion engine 1. The accelerator position sensor 6 outputs an electrical signal representing the amount of operation of the accelerator pedal (or the accelerator opening degree). The ECU 10 calculates the engine speed of the internal combustion engine 1 on the basis of the output signal of the crank position sensor 5 and calculates the engine load of the internal combustion engine 1 on the basis of the output signal of the accelerator position sensor 6.

The ECU 10 is electrically connected with various components such as the fuel injection valve 7 and the throttle valve 30 mentioned above. The ECU 10 electrically controls these components on the basis of the output signals of the aforementioned sensors.

<Heat Exchange Control>

In the following, transfer of heat from the EV drive system 23 to the internal combustion engine 1 by means of the heat exchange system 24 will be described. When the internal combustion engine 1 is not in a specific warmed-up state (in other words, when the specific warmed-up state of the internal combustion engine 1 is not established), the ECU 10 controls the heat exchange system 24 so that EV exhaust heat will be transferred to the internal combustion engine 1 while the vehicle 100 is running in the EV mode. This control performed by the ECU 10 will be hereinafter referred to as the "heat exchange control". The specific warmed-up state mentioned above is defined as a state in which the internal combustion engine 1 is warmed up to such an extent that the quantity of HC components discharged from the internal combustion engine 1 does not exceed a specific quantity. When the vehicle 100 is running in the EV mode, there is a possibility that the three-way catalyst provided in the exhaust passage 4 of the internal combustion engine 1 has not reached a fully warmed-up state in which the exhaust gas purification rate reaches nearly 100%. If the quantity of HC components discharged from the internal combustion engine 1 does not exceed the aforementioned specific quantity, the three-way catalyst will remove HC components to make the quantity of HC components emitted from the vehicle 100 (through the tailpipe) as small as possible, even when the three-way catalyst is not in a fully warmed-up state.

Figure 4:
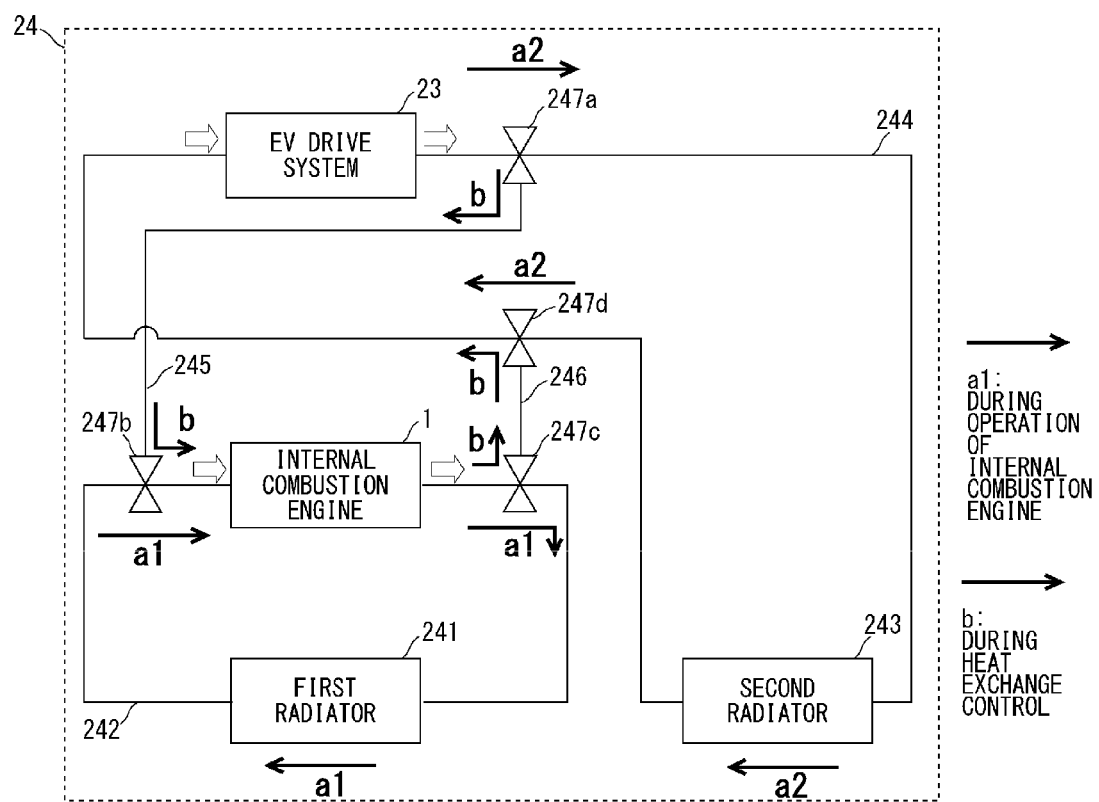
FIG. 4 is a first diagram illustrating the general configuration of a heat exchange system according to the first embodiment of the present disclosure.

FIG. 4 is a diagram illustrating the general configuration of the heat exchange system 24 according to the embodiment. The internal combustion engine 1 is connected with an engine cooling system for cooling the internal combustion engine 1. The engine cooling system includes a first radiator 241, a first circuit 242, a flow channel switching valves 247b, 247c, and a first water pump (electric pump) not illustrated in the drawings. In this cooling system, the first water pump discharges cooling water to the water jacket 1c of the internal combustion engine 1, and the cooling water flows in the water jacket 1c. The cooling water having flown in the water jacket 1c flows into the first radiator 241 through the first circuit 242. Heat exchange between the cooling water and the outside air occurs in the first radiator 241, so that heat is removed from the cooling water. The cooling water cooled in the first radiator 241 is pumped by the first water pump through the first circuit 242. Then, the cooling water is supplied to the water jacket 1c. Thus, the cooling water circulates in the engine cooling system. The circulation of the cooling water is carried out in the engine cooling system while the internal combustion engine 1 is operating. This circulation is indicated by arrows a1 in FIG. 4.

As illustrated in FIG. 4, the EV drive system 23 is connected with an EV cooling system for cooling the EV drive system 23. The EV cooling system includes a second radiator 243, a second circuit 244, flow channel switching valves 247a, 247d, and a second water pump (electric pump) not illustrated in the drawings. In this cooling system, the second water pump supplies cooling water to the water jacket of the EV drive system 23. Then, the cooling water flows into the second radiator 243 through the second circuit 244, where the cooling water is cooled. The cooling water cooled in the second radiator 243 is pumped up by the second water pump through the second circuit 244 and supplied to the water jacket of the EV drive system 23. Thus, the cooling water circulates in the EV cooling system. The circulation of the cooling water is carried out in the EV cooling system when the EV drive system 23 is operating (e.g. the vehicle 100 is running in the EV mode or the motor-generator is generating electrical power) and the internal combustion engine 1 is not in the specific warmed-up state. This circulation is indicated by arrows a2 in FIG. 4.

As described above, the ECU 10 performs the heat exchange control while the vehicle 100 is running in the EV mode when the internal combustion engine 1 is not in the specific warmed-up state. This will be described with reference to FIG. 4. In performing the heat exchange control, the ECU 10 functions as the heat exchange unit according to the present disclosure.

In the heat exchange control, the ECU 10 controls the flow channel switching valves 247a-247d. Specifically, the ECU 10 controls the flow channel switching valve 247a provided in the section of the second circuit 244 between the outlet of the water jacket of the EV drive system 23 and the second radiator 243 to connect the second circuit 244 and a third circuit 245. The flow channel switching valve 247a is a known switching valve (e.g. solenoid valve) that is adapted to be capable of selectively connecting the section of the second circuit 244 upstream of the flow channel switching valve 247a to the section of the second circuit 244 downstream of the flow channel switching valve 247a or the third circuit 245. Consequently, the cooling water flowing out of the water jacket of the EV drive system 23 is conducted into the third circuit 245. The third circuit 245 is a cooling water channel that connects the aforementioned flow channel switching valve 247a and the flow channel switching valve 247b provided in the section of the first circuit 242 between the first radiator 241 and the inlet of the water jacket 1c of the internal combustion engine 1. Then, the ECU 10 further controls the flow channel switching valve 247b to connect the third circuit 245 and the first circuit 242. The flow channel switching valve 247b has substantially the same structure as the flow channel switching valve 247a. The flow channel switching valve 247b is adapted to selectively connect the section of the first circuit 242 downstream of the flow channel switching valve 247b to the section of the first circuit 242 upstream of the flow channel switching valve 247b or the third circuit 245. Consequently, the cooling water having flown in the third circuit 245 is conducted into the water jacket 1c of the internal combustion engine 1.

Then, the ECU 10 further controls the flow channel switching valve 247c provided in the section of the first circuit 242 between the outlet of the water jacket 1c of the internal combustion engine 1 and the first radiator 241 to connect the first circuit 242 and a fourth circuit 246. Consequently, the cooling water flowing out of the water jacket 1c of the internal combustion engine 1 is conducted into the fourth circuit 246. The flow channel switching valve 247c is adapted to selectively connect the section of the first circuit 242 upstream of the flow channel switching valve 247c to the section of the first circuit 242 downstream of the flow channel switching valve 247c or the fourth circuit 246. Then, the ECU 10 controls the flow channel switching valve 247d provided in the section of the second circuit 244 between the second radiator 243 and the inlet of the water jacket of the EV drive system 23 to connect the fourth circuit 246 and the second circuit 244. Consequently, the cooling water having flown through the fourth circuit 246 is conducted into the water jacket of the EV drive system 23. The flow channel switching valve 247d is adapted to selectively connect the section of the second circuit 244 downstream of the flow channel switching valve 247d to the section of the second circuit 244 upstream of the flow channel switching valve 247d or the fourth circuit 246.

As the flow channel switching valves 247a-247d are controlled in the above-described manner, the cooling water flowing out of the water jacket of the EV drive system 23 is conducted into the water jacket 1c of the internal combustion engine 1 through the third circuit 245, and the cooling water flowing out of the water jacket 1c is conducted into the water jacket of the EV drive system 23 through the fourth circuit 246. Thus, the cooling water circulates between the EV drive system 23 and the internal combustion engine 1 and does not flow in the first radiator 241 or the second radiator 243 (as indicated by arrows b in FIG. 4). This channel of cooling will be referred to as the "heat exchange channel". When the heat exchange channel is open, the cooling water circulates between the EV drive system 23 and the internal combustion engine 1.

The heat exchange control is performed while the vehicle 100 is running in the EV mode. Therefore, while the heat exchange control is being performed, heat is generated in the EV drive system 23. In other words, EV exhaust heat is generated. The heat exchange control is performed when the internal combustion engine 1 is not operating and the internal combustion engine 1 is not in the specific warmed-up state. Then, the temperature of the internal combustion engine 1 is relatively low. Hence, during the heat exchange control, the EV exhaust heat is recovered by the cooling water (coolant) and transferred to the internal combustion engine 1 by means of the cooling water (coolant).

<Power Supply Control>

Next, control of power supply from the battery 22 to the ceramic heater 1b will be described. As described above, the ceramic heater 1b is a heating element that generates heat when electrical power is supplied to it from the battery 22. In the system according to this embodiment, as shown in FIG. 3, the ceramic heater 1b is disposed at a position at which it can heat the intake port 1a provided in the cylinder head of the internal combustion engine 1. In this embodiment, the ceramic heater 1b corresponds to the heater according to the present disclosure.

Fuel injected by the fuel injection valve 7 is apt to adhere to the intake port 1a. If the fuel adhering to the intake port 1a is sucked into the cylinder 2 without evaporating, there is a possibility that the fuel may be discharged from the cylinder 2 as unburned HC or PM.

If the temperature of intake port 1a is relatively high, fuel adhering to the intake port 1a will evaporate, so that adhesion of fuel will be prevented or reduced. In the system according to this embodiment, when the heat exchange control is performed while the vehicle 100 is running in the EV mode, the cooling water that has recovered the EV exhaust heat flows in the water jacket 1c of the internal combustion engine 1. Then, heat is transferred from the cooling water, which has relatively high temperature due to the recovery of the EV exhaust heat, to the intake port 1a. Then, it is considered that the intake port 1a would be warmed up to such an extent that the adhesion of fuel is prevented or reduced. However, depending on the quantity of the EV exhaust heat and the time of performing the heat exchange control, there is a possibility that the intake port 1a is not warmed up to such an extent that the adhesion of fuel is prevented or reduced, even when the heat exchange control is performed while the vehicle 100 is running in the EV mode. In this embodiment, if the intake port 1a is warmed up to such an extent that the adhesion of fuel is prevented or reduced, the specific warmed-up state of the internal combustion engine 1 is established, in other words the internal combustion engine 1 is in the specific warmed-up state.

The intake port 1a is also heated by the heat generated by the ceramic heater 1b. In the system according to this embodiment, the ECU 10 controls the electric heating of the intake port 1a by the ceramic heater 1b by controlling the supply of electrical power from the battery 22 to the ceramic heater 1b. Thus, the ECU 10 can warm up the intake port 1a to such an extent that the adhesion of fuel is prevented or reduced by using the ceramic heater 1b. In other words, the ECU 10 can bring the internal combustion engine 1 into the specific warmed-up state by using the ceramic heater 1b. However, heating the intake port 1a only by electric heating by the ceramic heater 1b leads to the problem of large electrical energy needed to bring the internal combustion engine 1 into the specific warmed-up state. In this embodiment, the intake port 1a corresponds to the specific adhesion site according to the present disclosure.

In view of the above, in this embodiment, the ECU 10 is configured to predict whether or not a specific condition will be met before the internal combustion engine 1 is started. This specific condition is that the internal combustion engine 1 is in the specific warmed-up state. If it is predicted that the specific condition will not be met before the start of the internal combustion engine 1, the ECU 10 let electrical power be supplied from the battery 22 to the ceramic heater 1b before the internal combustion engine 1 is started. On the other hand, if it is predicted that the specific condition will be met before the start of the internal combustion engine 1, the ECU 10 does not let electrical power be supplied from the battery 22 to the ceramic heater 1b. This will be specifically described in the following with reference to a flow chart.

Figure 5:
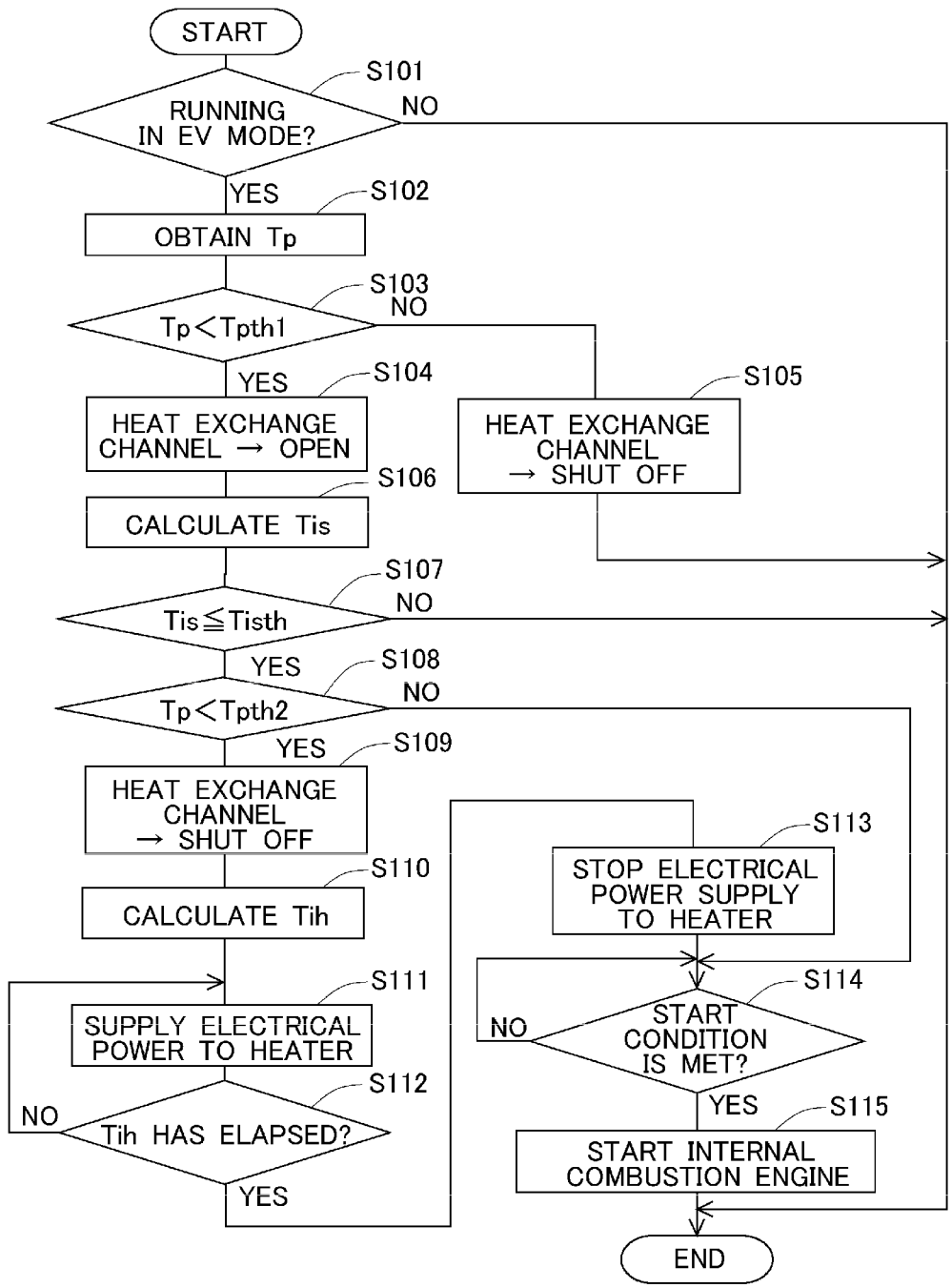
FIG. 5 is a flow chart of a control process according to the first embodiment of the present disclosure.

FIG. 5 is a flow chart of a control process according to this embodiment. In this embodiment, the ECU 10 executes this process repeatedly at a predetermined calculation cycle.

Firstly in step S101 of this process, it is determined whether or not the vehicle 100 is running in the EV mode. If an affirmative determination is made in step S101, the ECU 10 executes the processing of step S102 next. If a negative determination is made in step S101, the execution of this process is terminated.

If an affirmative determination is made in step S101, then in step S102 the temperature Tp of the intake port 1a (which will also be referred to as the "port temperature" hereinafter) is obtained. In step S102, the port temperature Tp is estimated from the cooling water temperature in the water jacket 1c of the internal combustion engine 1, the coefficient of heat transfer between the cooling water and the intake port 1a, and the heat capacity of the cylinder head in which the intake port 1a is provided etc. The cooling water temperature mentioned above may be measured using a temperature sensor. The coefficient of heat transfer and the heat capacity mentioned above may be values determined in advance. Alternatively, the port temperature Tp may be obtained by direct measurement by a temperature sensor. Other known methods may be employed to obtain the port temperature Tp. In obtaining the port temperature Tp as above, the ECU 10 functions as the controller according to the present disclosure.

Then, in step S103, it is determined whether or not the port temperature Tp obtained in step S102 is lower than a first threshold temperature Tpth1. The first threshold temperature Tpth1 is a temperature used to determine whether or not the aforementioned specific condition is met. If the port temperature Tp is equal to or higher than the first threshold temperature Tpth1, it may be determined that the specific condition is met, namely the internal combustion engine 1 is in the specific warmed-up state. When the port temperature Tp is equal to or higher than the first threshold temperature Tpth1, fuel adhering to the intake port 1a is apt to evaporate, so that the adhesion of fuel is prevented or reduced. Therefore, the first threshold temperature Tpth1 is defined as a port temperature at which the adhesion of fuel to the intake port 1*a* is prevented or reduced. If an affirmative determination is made in step S101, the ECU 10 executes the processing of step S102 next. If a negative determination is made in step S101, the execution of this process is terminated. In determining whether the specific condition is met as above, the ECU 10 functions as the controller according to the present disclosure.

If an affirmative determination is made in step S103, then in step S104 the flow channel switching valves 247*a*-247*d* are controlled so as to open the aforementioned heat exchange channel. In other words, the heat exchange control is performed to control the heat exchange system 24 in such a way that the EV exhaust heat is transferred to the internal combustion engine 1. As above, in this embodiment, the heat exchange control is performed when the vehicle 100 is running in the EV mode and the internal combustion engine 1 is not in the specific warmed-up state. On the other hand, if a negative determination is made in step S103, then in step S105 the flow channel switching valves 247*a*-247*d* are controlled so as to shut off the aforementioned heat exchange channel. After the completion of the processing of step S105, the execution of this process is ended.

After the processing of step S104, the remaining time Tis until the internal combustion engine 1 is started is calculated in step S106. This time Tis will also be simply referred to as the remaining time Tis. In step S106, specifically, the remaining time Tis is calculated from the SOC amount, the temperature of the battery 22, and the required load of the vehicle 100 etc.

When the energy of the battery 22 is consumed in the vehicle 100 by EV mode running and the SOC amount becomes equal to or smaller than a specific first charge amount SOC1, the battery 22 is charged using the driving force of the internal combustion engine 1. Specifically, the MG1 is driven by the internal combustion engine 1 through the power splitting system 12 to generate alternating current power. The alternating current power thus generated is converted into direct current power by the PCU 21 and supplied to the battery 22. Therefore, the remaining time Tis can be calculated on the basis of the difference between the SOC amount at the present time and the first charge amount SOC1. In this calculation, the decrease rate of the SOC amount in the future is taken into account, which is estimated on the basis of the temperature of the battery 22 and the required load of the vehicle 100 etc.

The decrease rate of the SOC amount in the future may be estimated on the assumption that the required load of the vehicle 100 will not change in the future. Alternatively, information about the route along which the vehicle 100 will travel may be obtained, and the required load of the vehicle 100 in the future may be estimated on the basis of this information. Then, the decrease rate of the SOC amount in the future may be estimated on the basis of the estimated required load in the future. In this estimation, the history of travel of the vehicle 100 in the past may be taken into consideration.

Then, in step S107, it is determined whether or not the remaining time Tis calculated in step S106 is equal to or shorter than a threshold time Tisth. The threshold time Tisth is a time required to raise the port temperature Tp to the first threshold temperature Tpth1 only by electric heating of the intake port 1*a* by the ceramic heater 1*b* when the internal combustion engine 1 is in a specific low temperature state. The specific low temperature state is, for example, a state of the internal combustion engine 1 in the case where the vehicle 100 is in a very low temperature environment. If an affirmative determination is made in step S107, the ECU 10 executes the processing of step S108 next. If a negative determination is made in step S107, the execution of this flow is terminated.

If an affirmative determination is made in step S107, then in step S108, it is determined whether or not the port temperature Tp obtained in step S102 is lower than a second threshold temperature Tpth2. The second threshold temperature Tpth2 is a specific temperature, lower than the aforementioned first threshold temperature Tpth1, that is used to determine whether or not the aforementioned specific condition will be met before the start of the internal combustion engine 1. Specifically, if the port temperature Tp is equal to or higher than the second threshold temperature Tpth2, it may be predicted that the specific condition will be met by the time the internal combustion engine 1 is started by continuing the execution of the heat exchange control. An affirmative determination made in step S108 means the prediction that the specific condition will not be met (in other words, the internal combustion engine 1 will not reach the specific warmed-up state) before the start of the internal combustion engine 1, and then the ECU 10 executes the processing of step S109 next. On the other hand, a negative determination made in step S108 means the prediction that the specific condition will be met (in other words, the internal combustion engine 1 will reach the specific warmed-up state) before the start of the internal combustion engine 1, and then the ECU 10 executes the processing of step S114 next. In this process, the ECU 10 functions as the controller according to the present disclosure in predicting whether or not the specific condition will be met before the start of the internal combustion engine 1 at the time when an affirmative determination is made in step S107 as above.

If an affirmative determination is made in step S108, then in step S109 the flow channel switching valves 247*a*-247*d* are controlled in such a way as to shut off the heat exchange channel. When the processing of step S109 is executed, the circulation of the cooling water in the water jacket 1*c* of the internal combustion engine 1 is stopped. In consequence, when the intake port 1*a* is electrically heated by the ceramic heater 1*b* in the processing of S111 that will be described later, a situation in which the heat generated by the ceramic heater 1*b* is carried away by the cooling water is prevented from occurring.

Then, in step S110, the duration Tih of power supply from the battery 22 to the ceramic heater 1*b* (which will be also referred to as the "power supply time" hereinafter) is calculated. In step S110, specifically, the power supply time Tih is calculated on the basis of the port temperature Tp obtained in step S102. More specifically, the larger the difference between the first threshold temperature Tpth1 and the port temperature Tp is, the longer the power supply time Tih is calculated. Then, in step S111, electrical power is supplied from the battery 22 to the ceramic heater 1*b*. Then, in step S112, it is determined whether or not the power supply time Tih calculated in step S110 has elapsed. If an affirmative determination is made in step S112, the ECU 10 executes the processing of step S113 next, where the power supply from the battery 22 to the ceramic heater 1*b* is stopped. On the other hand, if a negative determination is made in step S112, the ECU 10 executes the processing of step S111 again.

Then, in step S114, it is determined whether or not a start condition for starting the internal combustion engine 1 is met. In this process, when the SOC amount decreases to the first charge amount SOC1, it is determined that the start condition is met. If an affirmative determination is made in step S114, the ECU 10 executes the processing of step S115 next. If a negative determination is made in step S114, the ECU 10 executes the processing of step S114 again. The start condition may also be met when the required load of the vehicle 100 exceeds a predetermine load. In that case, the ECU 10 may start the internal combustion engine 1 to meet the required load of the vehicle 100 promptly, even if the internal combustion engine 1 is not in the specific warmed-up state. In the case where the internal combustion engine 1 is started in such circumstances, if the flow channel switching valves 247a-247d are controlled in such a way as to open the heat exchange channel, the ECU 10 controls the flow channel switching valves 247a-247d so as to shut off the heat exchange channel before the internal combustion engine 1 is started.

If an affirmative determination is made in step S114, then in step S115 the internal combustion engine 1 is started. After the completion of the processing of step S115, the execution of this process is ended. When the internal combustion engine 1 is started in step S115, if the flow channel switching valves 247a-247d are controlled in such a way as to open the heat exchange channel (this is the case when step S108 was answered in the negative and step S114 was answered in the affirmative), the ECU 10 controls the flow channel switching valves so as to shut off the heat exchange channel before the internal combustion engine 1 is started.

When the internal combustion engine 1 is not in the specific warmed-up state while the vehicle 100 is running in the EV mode, the above-described process can bring the internal combustion engine 1 into the specific warmed-up state before the internal combustion engine 1 is started by performing the heat exchange control or by performing the heat exchange control and electric heating of the intake port 1a by the ceramic heater 1b (though the heat exchange control is not performed while the electric heating of the intake port 1a is being performed). This can reduce HC emissions from the vehicle 100 during the startup of the internal combustion engine 1. Since the intake port 1a is warmed up by the heat exchange control and electric heating by the ceramic heater 1b, the electrical energy needed to warm up the intake port 1a can be reduced as compared to that in the case where the intake port 1a is warmed up only by the electric heating by the ceramic heater 1b. If it is predicted that the internal combustion engine 1 will reach the specific warmed-up state before the start of the internal combustion engine 1, electric hearting of the intake port 1a by the ceramic heater 1b is not performed. This enables a reduction in the electrical energy needed to warm up the intake port 1a.

The ECU 10 functions as the controller according to the present disclosure in executing the processing of steps S109 to S113 according to a determination made in step S108.

Figure 6A:
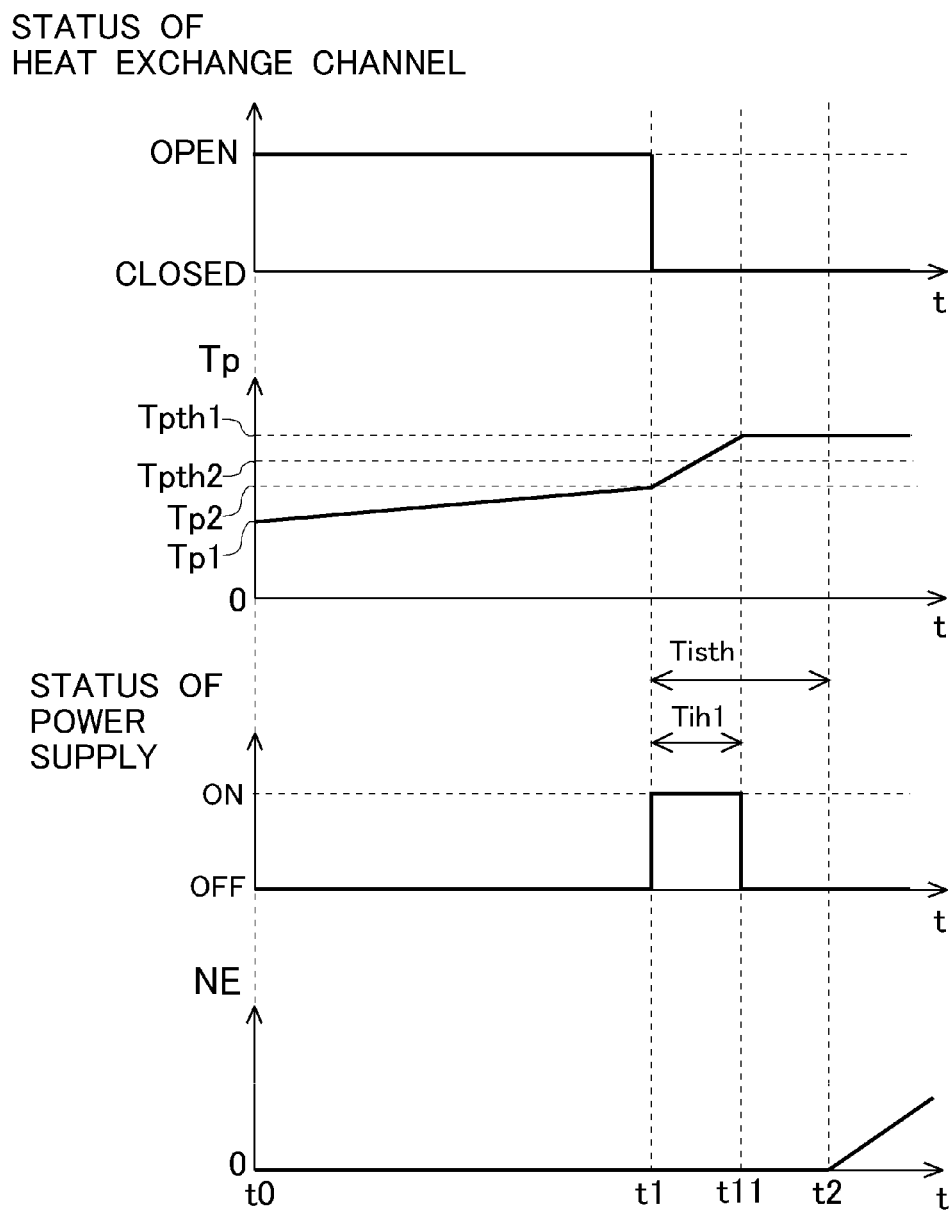
FIG. 6A is a time chart illustrating changes with time of the open status of a heat exchange channel, the port temperature, the status of power supply to a ceramic heater, and the engine speed of the internal combustion engine in a case where heat exchange control and electric heating of an intake port by the ceramic heater are performed in the control process illustrated in FIG. 5.
Figure 6B:
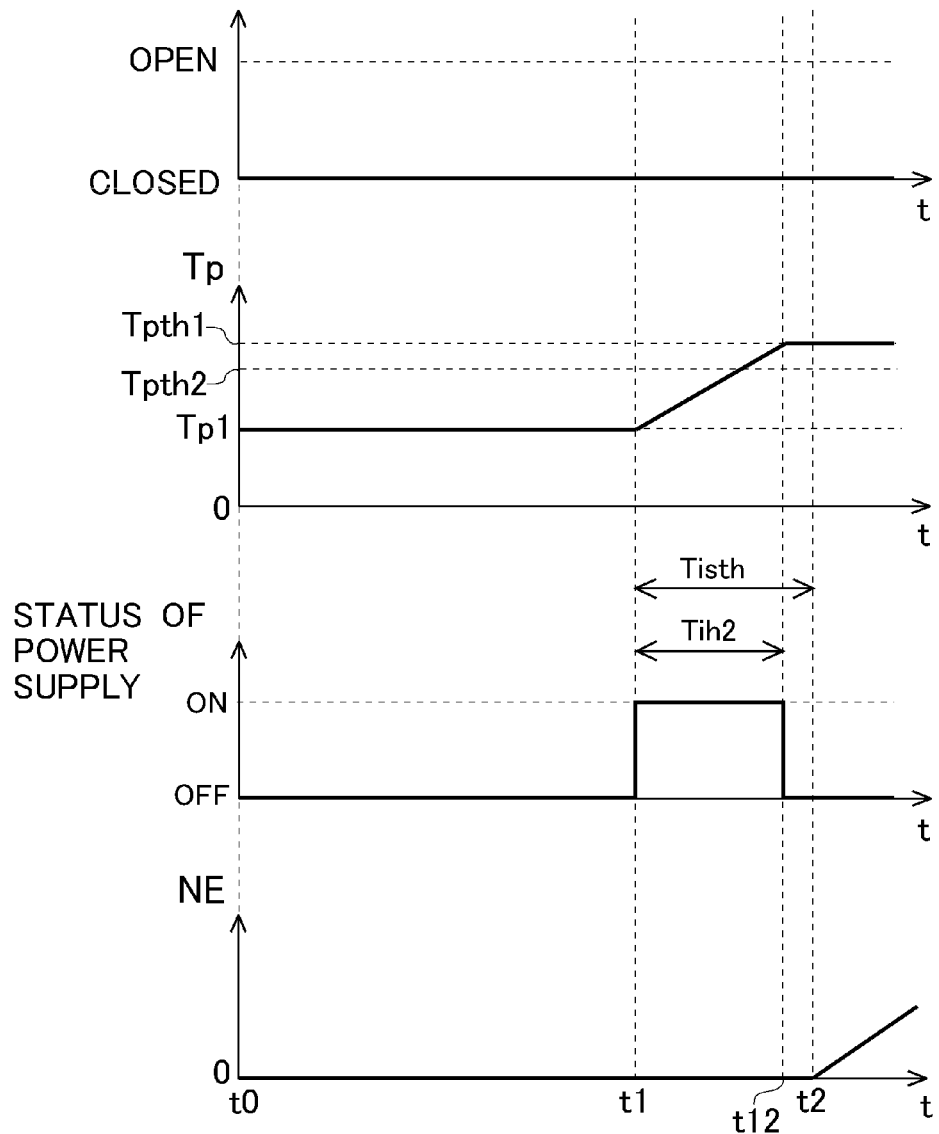
FIG. 6B is a time chart illustrating changes with time of the open status of the heat exchange channel, the port temperature, the status of power supply to the ceramic heater, and the engine speed of the internal combustion engine in a case where the intake port is warmed up only by electric heating by the ceramic heater without the control process illustrated in FIG. 5 being executed.

Next, the above-described control process will be briefly described with reference to a time chart. FIG. 6A is a time chart illustrating changes with time of the open status of the heat exchange channel, the port temperature Tp, the status of power supply to the ceramic heater 1b, and the engine speed NE of the internal combustion engine 1 in a case where the heat exchange control and electric heating of the intake port 1a by the ceramic heater 1b are performed in the above-described control process. FIG. 6B is a time chart for comparison with FIG. 6A, illustrating changes with time of the above parameters in a case where the intake port 1a is warmed up only by electric heating by the ceramic heater 1b without the above-described process being executed. In FIGS. 6A and 6B, it is assumed that the vehicle 100 is running in the EV mode during the period from time t0 to time t2. It is also assumed that the aforementioned remaining time Tis becomes equal to the threshold time Tisth at time t1.

As shown in FIG. 6A, at time t0, the port temperature Tp1 is lower than the first threshold temperature Tpth1, and the vehicle 100 is running in the EV mode. Then, the heat exchange channel is open, namely the heat exchange control is being performed. In consequence, the EV exhaust heat is transferred to the intake port 1a, and the port temperature rises with the lapse of time. At time t1 at which the remaining time Tis becomes equal to the threshold time Tisth, the port temperature, which has been rising, is Tp2. This port temperature Tp2 is lower than the second threshold temperature Tpth2. Therefore, the heat exchange channel is shut off at time t1 (corresponding to the processing of steps S107 to S109 in FIG. 5). Thus, the heat exchange control is terminated. At this time, the aforementioned power supply time is calculated, and electrical power is supplied from the battery 22 to the ceramic heater 1b for the calculated time Tih1 (corresponding to the processing of steps S110 to S113 in FIG. 5). Consequently, the port temperature reaches the first threshold temperature Tpth1 at time t11 after the lapse of time Tih1 from time t1. As above, the control according to the embodiment can bring the internal combustion engine 1 into the specific warmed-up state at time t11 before time t2 at which the internal combustion engine 1 is started.

In the control illustrated in FIG. 6B, the heat exchange control is not performed. Therefore, the heat exchange channel is closed. Consequently, the port temperature remains at Tp1 from time t0 to time t1. At time t1, the power supply time is calculated, and electrical power is supplied from the battery 22 to the ceramic heater 1b for the calculated time Tih2. Consequently, the port temperature reaches the first threshold temperature Tpth1 at time t12 after the lapse of time Tih2 from time t1.

As above, the control illustrated in FIG. 6B also can bring the internal combustion engine 1 into the specific warmed-up state before the internal combustion engine 1 is started. However, the power supply time Tih2 in FIG. 6B is longer than the power supply time Tih1 in FIG. 6A. This means that the electrical energy needed to achieve the specific warmed-up state of the internal combustion engine 1 is larger in the case where the control illustrated in FIG. 6B is performed than in the case where the control illustrated in FIG. 6A is performed. In other words, warming-up the intake port 1a by the heat exchange control and electric heating by the ceramic heater 1b can make the electrical energy needed to warm up the intake port 1a smaller than in the case where the intake port 1a is warmed up only by the electric heating by the ceramic heater 1b.

In the above-described control process, the prediction as to whether the specific condition will be met or not is made at the time when the remaining time Tis becomes equal to the threshold time Tisth. However, the time at which this prediction is made is not limited to the time when the remaining time Tis becomes equal to the threshold time Tisth. The ECU 10 may predict whether or not the specific condition will be met at a certain time while the heat exchange control is being performed.

Figure 7:
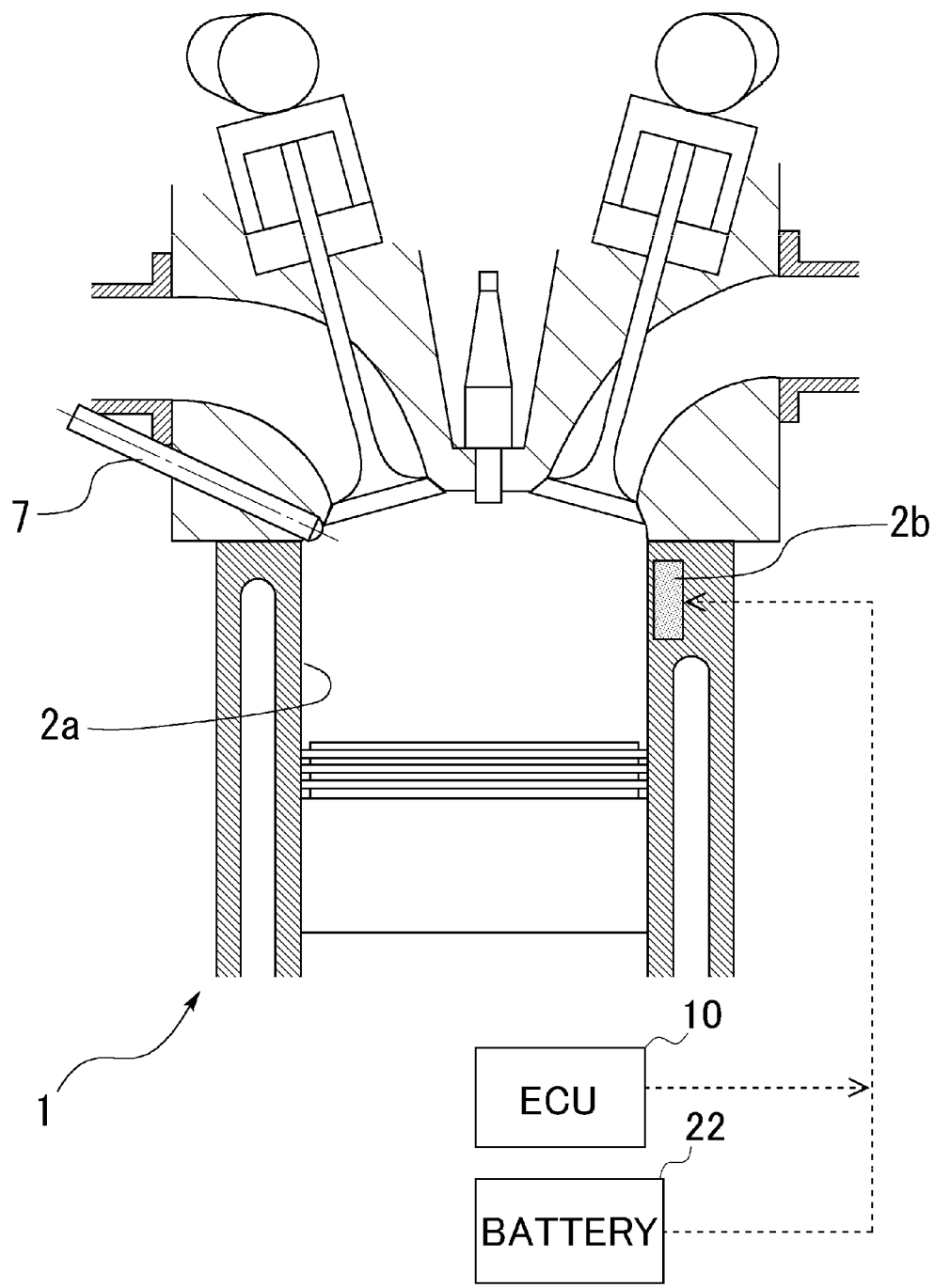
FIG. 7 is a second schematic cross sectional view of the cylinder of the internal combustion engine according to the first embodiment of the present disclosure.

In the above description of the embodiment, there has been described a case where the ceramic heater 1b heats the intake port 1a. However, the portion heated by the ceramic heater 1b is not limited to the intake port 1a. For example, in the case of an internal combustion engine 1 having a fuel injection valve 7 that injects fuel directly into the cylinder 2 as illustrated in FIG. 7, the sleeve 2a of the cylinder 2 may be heated by a ceramic heater 2b. In this case, the ceramic heater 2b is embedded in the wall of the sleeve 2a opposed to the fuel injection valve 7 as illustrated in FIG. 7.

In such an arrangement, fuel injected by the fuel injection valve 7 is apt to adhere to the sleeve 2a. Therefore, the amount of HC discharged from the internal combustion engine 1 can be reduced by warming up the sleeve 2a by the heat exchange control or the heat exchange control and electric heating of the sleeve 2a by the ceramic heater 2b to such an extent that the adhesion of fuel is prevented or reduced.

In the case where the sleeve 2a is warmed up as above, the port temperature Tp in the relevant processing in the above-described process in FIG. 5 is replaced by the temperature of the sleeve 2a.

The heat exchange system 24 according to the embodiment is not limited to that illustrated in FIG. 4. For example, the heat exchange system 24 may be replaced by another system illustrated in FIG. 8.

Figure 8:
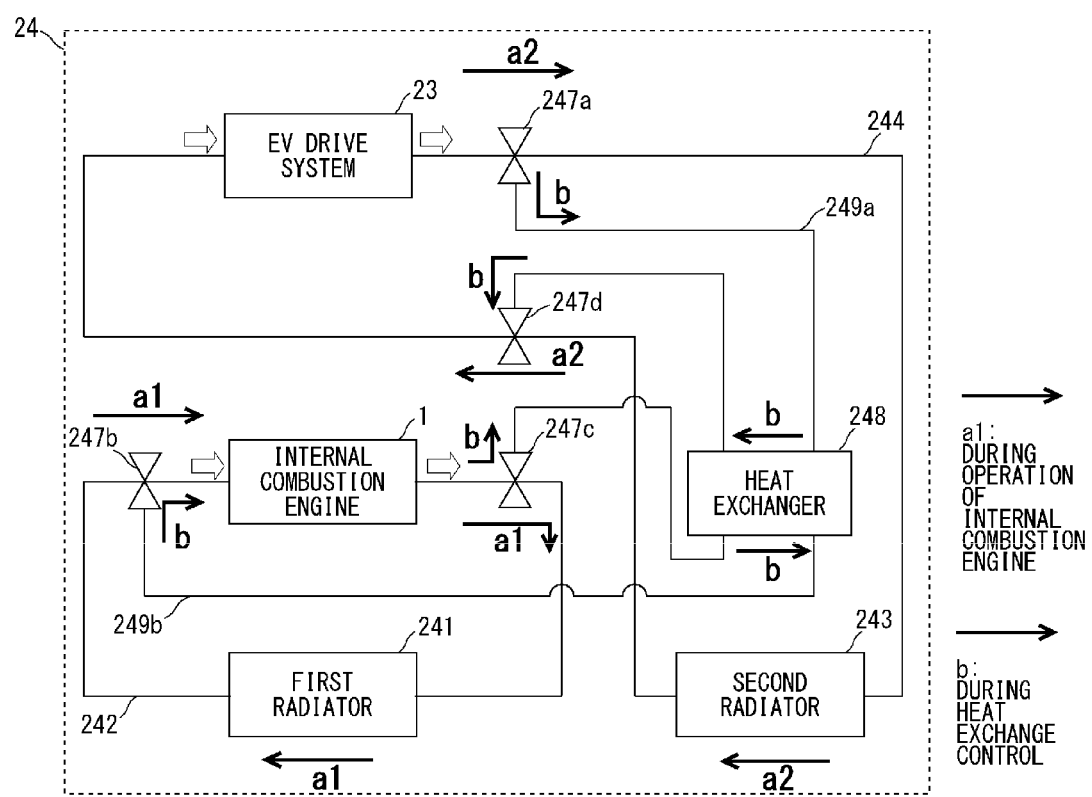
FIG. 8 is a second diagram illustrating the general configuration of the heat exchange system according to the first embodiment of the present disclosure.

The heat exchange system illustrated in FIG. 8 includes a fifth circuit 249a and a sixth circuit 249b in place of the third circuit 245 and the fourth circuit 246 in the system illustrated in FIG. 4. The fifth circuit 249a is a flow channel of cooling water that conducts the cooling water flowing out of the water jacket of the EV drive system 23 to a heat exchanger 248 and conducts the cooling water flowing out of the heat exchanger 248 to the water jacket of the EV drive system 23, thereby enabling the cooling water to circulate between the EV drive system 23 and the heat exchanger 248. The sixth circuit 249b is a flow channel of cooling water that conducts the cooling water flowing out of the water jacket 1c of the internal combustion engine 1 to the heat exchanger 248 and conducts the cooling water flowing out of the heat exchanger 248 to the water jacket 1c, thereby enabling the cooling water to circulate between the internal combustion engine 1 and the heat exchanger 248. In this system, the heat of the EV cooling system (i.e. the cooling system for the EV drive system 23) is transferred to the engine cooling system in the heat exchanger 248. In other words, when the heat exchange control is performed, the EV exhaust heat is recovered by the cooling water in the EV cooling system and then transferred to the cooling water in the engine cooling system in the heat exchanger 248. Then, the heat of the cooling water in the engine cooling system is transferred to the internal combustion engine 1. Thus, the EV exhaust heat is transferred to the internal combustion engine 1 by the cooling water serving as a medium.

Modification of First Embodiment

Next, a modification of the above-described first embodiment will be described. In the following description, components in this modification substantially equivalent to those in the first embodiment will not be described in detail.

In the above-described system according to the first embodiment, the intake port 1a (or the sleeve 2a) is electrically heated to prevent or reduce the adhesion of fuel to the intake port 1a (or the sleeve 2a). In consequence, the amount of unburned HC and PM discharged from the cylinder 2 is reduced. In this modification, the cooling water of the engine cooling system is electrically heated. This can also prevent or reduce the adhesion of fuel to the intake port 1a (or the sleeve 2a), enabling a reduction of the amount of unburned HC and PM discharged from the cylinder 2.

Figure 9:
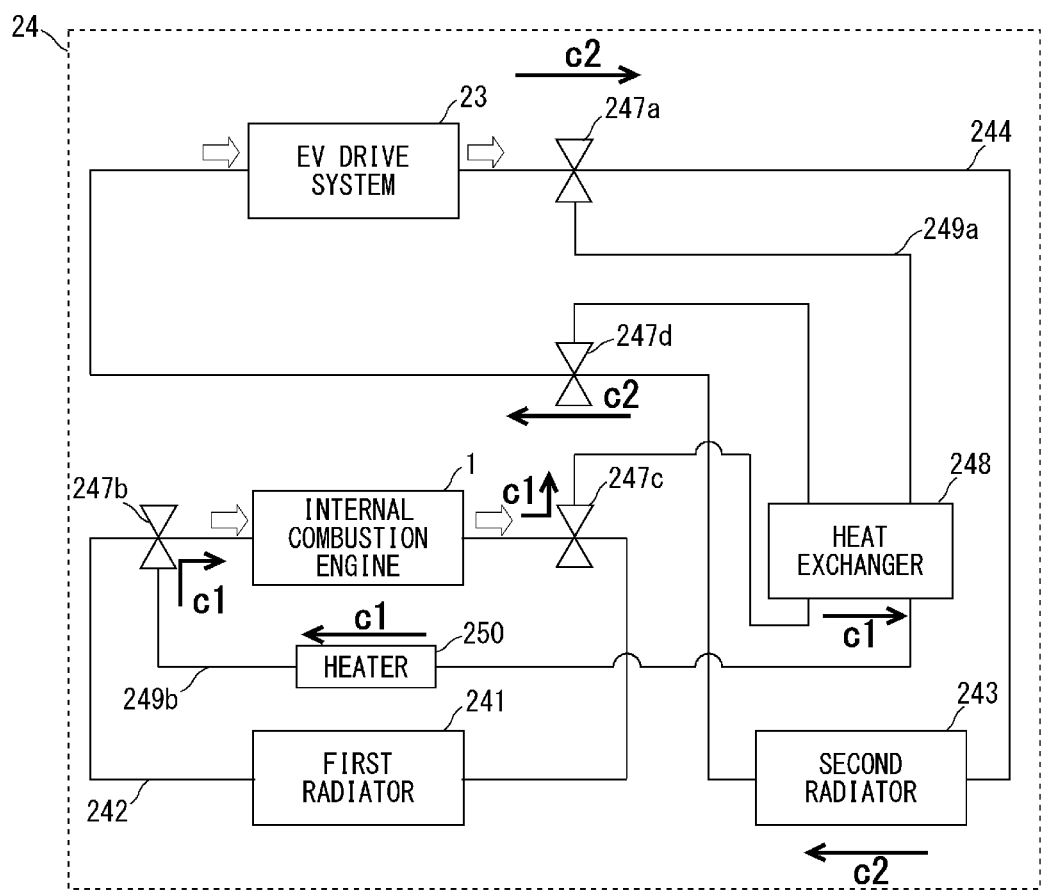
FIG. 9 is a diagram illustrating the general configuration of a heat exchange system according to a modification of the first embodiment of the present disclosure.

FIG. 9 is a diagram illustrating the general configuration of a heat exchange system 24 according to the modification. The heat exchange system 24 according to the modification includes the fifth circuit 249a, the sixth circuit 249b, and the heat exchanger 248 described in the above description of the first embodiment. The heat exchange system 24 according to the modification further includes a heater 250 that electrically heats the cooling water in the engine cooling system.

In the system according to the modification, when electrical power is supplied to the heater 250, the flow channel switching valves 247b, 247c are controlled in such a way as to cause the cooling water to circulate between the internal combustion engine 1 and the heat exchanger 248 (as indicated by arrows c1 in FIG. 9). In the EV cooling system, when electrical power is supplied to the heater 250, the flow channel switching valves 247a, 247d are controlled in such a way as to cause the cooling water to circulate between the EV drive system 23 and the second radiator 243 (as indicated by arrows c2 in FIG. 9). In consequence, no substantial heat exchange occurs in the heat exchanger 248. This prevents the heat of the heater 250 from being transferred to the EV cooling system.

When the cooling water flowing in the water jacket 1c of the internal combustion engine 1 is heated by the heater 250, the intake port 1a or the sleeve 2a is warmed up by the cooling water. In consequence, the adhesion of fuel to them is prevented or reduced.

Figure 10:
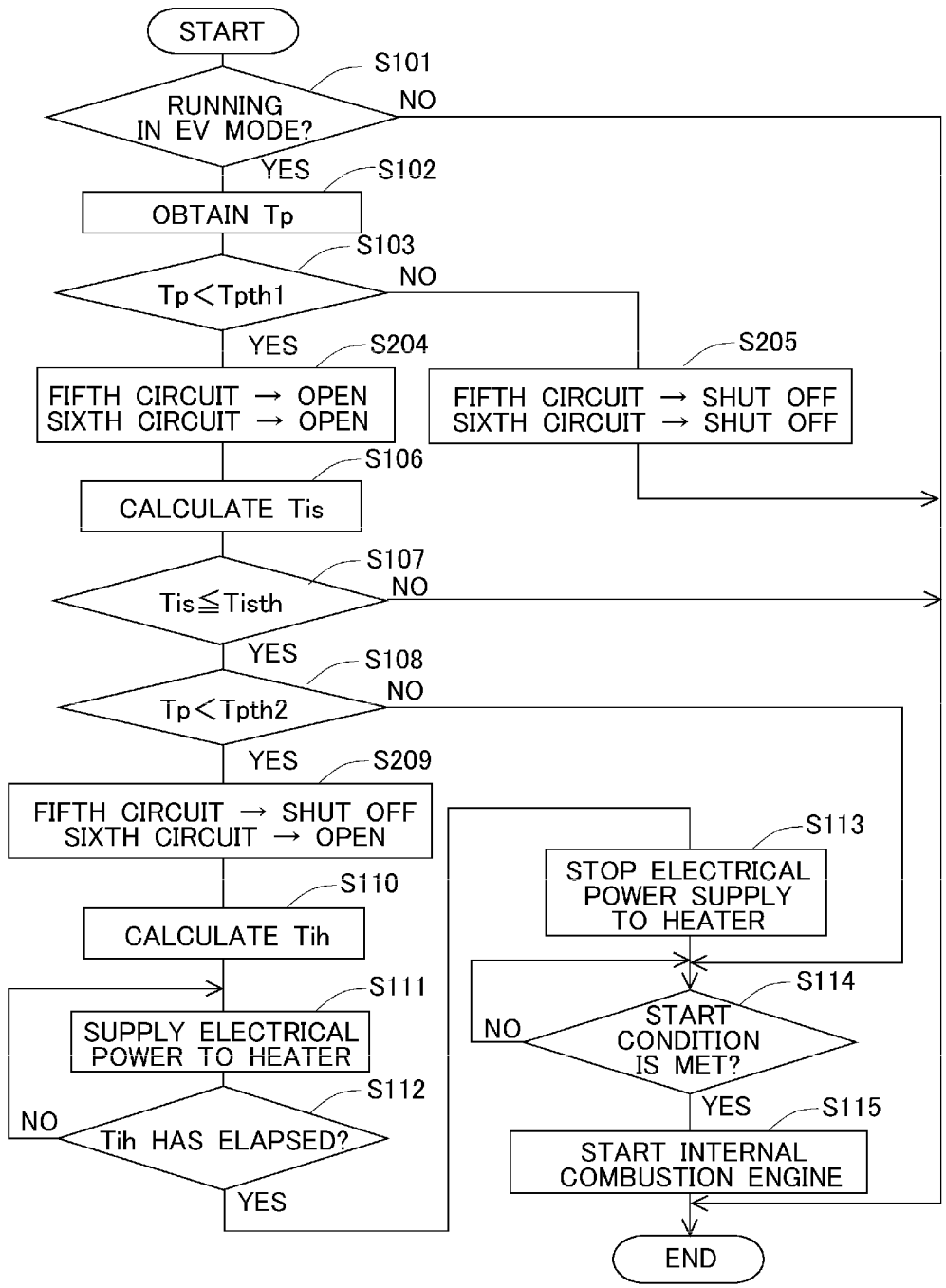
FIG. 10 is a flow chart of a control process according to the modification of the first embodiment of the present disclosure.

FIG. 10 is a flow chart of a control process according to the modification. In the system according to the modification, the ECU 10 executes this process repeatedly at a predetermined calculation cycle. The processing steps in FIG. 10 that are substantially the same as those in FIG. 5 are denoted by the same reference signs to eliminate detailed description thereof.

In the process illustrated in FIG. 10, if an affirmative determination is made in step S103, then in step S204 the flow channel switching valves 247a-247d are controlled in such a way as to open the fifth circuit 249a and the sixth circuit 249b. Thus, the heat exchange control is performed to control the heat exchange system 24 in such a way that the EV exhaust heat is transferred to the internal combustion engine 1. After the processing of step S204, the processing of step S106 is executed. On the other hand, if a negative determination is made in step S103, then in step S205 the flow channel switching valves 247a-247d are controlled in such a way as to shut off the fifth circuit 249a and the sixth circuit 249b. After the processing of step S205, the execution of this process is ended.

In the process illustrated in FIG. 10, if an affirmative determination is made in step S108, then in step S209 the flow channel switching valves 247a-247d are controlled in such a way as to shut off the fifth circuit 249a and to open the sixth circuit 249b. After the processing of step S209, the processing of S110 is executed.

The control process illustrated in FIG. 10 can also achieve both a reduction in the emission of harmful substances from the vehicle 100 during the startup of the internal combustion engine 1 and a reduction in the electric energy required for electric heating of the internal combustion engine 1.

Second Embodiment

A second embodiment of the present disclosure will be described in the following. Features and control processing in the second embodiment that are substantially the same as those in the first embodiment will not be described in detail.

In the above-described first embodiment, the intake port 1a (or the sleeve 2a) is electrically heated to prevent or reduce the adhesion of fuel to the intake port 1a (or the sleeve 2a), so that the amount of unburned HC and PM discharged from the cylinder 2 is reduced. In the second embodiment, a portion of the internal combustion engine 1 that can heat fuel is electrically heated. In consequence, the temperature of fuel rises to facilitate atomization of fuel injected through the fuel injection valve 7. This reduces the adhesion of fuel to the sleeve or other portions.

Figure 11:
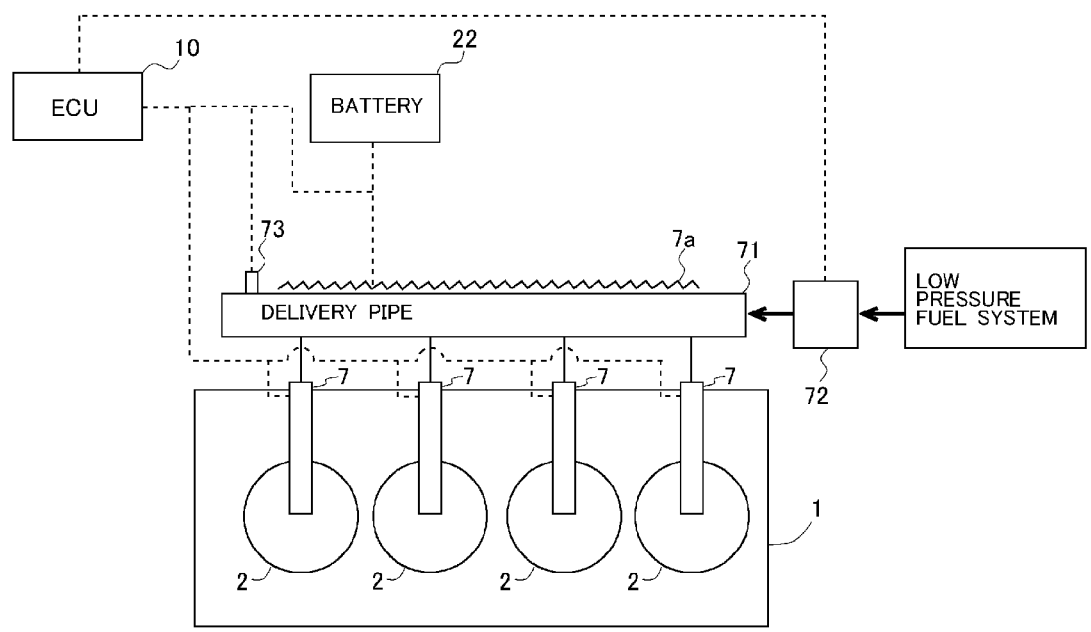
FIG. 11 is a diagram illustrating the general configuration of a high pressure fuel system of an internal combustion engine according to a second embodiment of the present disclosure.

An internal combustion engine 1 according to the second embodiment is provided with a high pressure fuel system illustrated in FIG. 11. FIG. 11 is a diagram illustrating the general configuration of the high pressure fuel system of the internal combustion engine 1. As illustrated in FIG. 11, each cylinder 2 of the internal combustion engine 1 is provided with a fuel injection valve 7 that injects fuel directly into the cylinder 2. The fuel injection valve 7 is connected to a delivery pipe 71, to which fuel that has been pumped to high pressure by a high pressure pump 72 is supplied. The delivery pipe 71 is provided with a fuel temperature sensor 73 that measures the temperature of the fuel in the delivery pipe 71.

The delivery pipe 71 is provided with heating wire 7a that electrically heats the fuel in the delivery pipe 71. The heating wire 7a is a heating element that functions as an electrical resistance to generate heat when electrical current is supplied thereto. Electrical current for energizing the heating wire 7a is supplied from a battery 22 through a power cable.

When the heating wire 7a is energized to generate heat and the delivery pipe 71 is heated, the fuel in the delivery pipe 71 is heated. Then, fuel having a relatively high temperature is injected through the fuel injection valve 7, and atomization of fuel in the cylinder 2 is facilitated. The facilitated atomization of fuel prevents injected fuel from striking on the sleeve in the form of droplets. Therefore, the adhesion of fuel to the sleeve is prevented or reduced. In consequence, the amount of unburned HC and PM discharged from the cylinder 2 is reduced.

In the internal combustion engine 1 according to this embodiment, the heat of the heating wire 7a is not apt to be transferred to the cooling water. Therefore, the heat exchange control may continue to be performed when the delivery pipe 71 is being electrically heated by the heating wire 7a in this embodiment.

In this case, if an affirmative determination is made in step S108 in the control process illustrated in FIG. 5, then the processing of step S110 is executed next. In other words, the heat exchange channel is not shut down by the processing of step S109. Thus, even while the delivery pipe 71 is being electrically heated by the heating wire 7a, the heat exchange control continues to be performed. This favorably prevents or reduces the adhesion of fuel to the sleeve.

In this embodiment, the processing in the control process illustrated in FIG. 5 is executed on the basis of the temperature of the sleeve instead of the port temperature Tp. When the internal combustion engine 1 is started in the processing of step S115 in the process illustrated in FIG. 5, the flow channel switching valves 247a-247d are controlled in such a way as to shut off the heat exchange channel before the internal combustion engine 1 is started.

This control process can also achieve both a reduction in the emission of harmful substances from the vehicle 100 during the startup of the internal combustion engine 1 and a reduction in the electric energy required for electric heating of the internal combustion engine 1.

What is claimed is:

1. A control apparatus for a hybrid vehicle provided with an internal combustion engine and an electric motor and capable of running in EV mode in which the hybrid vehicle runs by driving force generated by the electric motor with the internal combustion engine turned off, comprising:

a heat exchange system configured to be capable of recovering EV exhaust heat, which is defined as heat generated in a specific drive apparatus including the electric motor while the hybrid vehicle is running in the EV mode, by a coolant and transferring the EV exhaust heat to the internal combustion engine by means of the coolant;

a heater configured to generate heat when electrical power is supplied to it, to heat the internal combustion engine;

a battery that supplies electrical power to the heater; and a controller configured to:

determine whether or not a specific condition that the internal combustion engine is in a specific warmed-up state is met when the hybrid vehicle is running in the EV mode;

perform a heat exchange control to control the heat exchange system in such a way that the EV exhaust heat is transferred to the internal combustion engine while the hybrid vehicle is running in the EV mode, if it is determined by the controller that the specific condition is not met;

predict whether or not the specific condition will be met as a result of the heat exchange control performed by the controller before the internal combustion engine is started; and control supply of electrical power from the battery to the heater in such a way as to let electrical power be supplied from the battery to the heater before the internal combustion engine is started if it is predicted by the controller that the specific condition will not be met before the start of the internal combustion engine and not to let electrical power be supplied from the battery to the heater if it is predicted by the controller that the specific condition will be met before start of the internal combustion engine.

2. A control apparatus for a hybrid vehicle according to claim 1, wherein the controller is configured to predict whether or not the specific condition will be met before the internal combustion engine is started at a certain time while the heat exchange control is being performed by the controller, and if it is predicted by the controller that the specific condition will not be met before the start of the internal combustion engine, the controller lets electrical power be supplied from the battery to the heater and the controller terminates the heat exchange control before the internal combustion engine is started, and if it is predicted by the controller that the specific condition will be met before the start of the internal combustion engine, the controller does not let electrical power be supplied from the battery to the heater and the controller continues to perform the heat exchange control.

3. A control apparatus for a hybrid vehicle according to claim 1, wherein the heater is configured to be capable of heating a specific adhesion site relevant to adhesion of fuel injected through a fuel injection valve provided in the internal combustion engine.

4. A control apparatus for a hybrid vehicle according to claim 3, wherein the controller is further configured to obtain the temperature of the adhesion site, the controller determines that the specific condition is met, if the temperature of the adhesion site obtained by the controller while the hybrid vehicle is running in the EV mode is equal to or higher than a first threshold temperature, the controller predicts that the specific condition will not be met before the internal combustion engine is started, if the temperature of the adhesion site obtained by the controller while the hybrid vehicle is running in the EV mode is lower than a second threshold temperature that is lower than the first threshold temperature, and if it is predicted by the controller that the specific condition will not be met before the start of the internal combustion engine, the controller controls the electrical energy supplied from the battery to the heater on the basis of the temperature of the adhesion site obtained by the controller.

5. A control apparatus for a hybrid vehicle according to claim 1, wherein the controller predicts a start time at which the internal combustion engine will be started next time when the hybrid vehicle is running in the EV mode, calculates a remaining time from the present to the start time, and predicts whether or not the specific condition will be met before the internal combustion engine is started at the time when the remaining time becomes equal to a time required to bring the internal combustion engine into the specific warmed-up state only by electrically heating the internal combustion engine by the heater.

* * * * *